May 30, 1967  D. M. ANDERSON  3,321,973
TEST APPARATUS AND MOLD FOR MOLTEN METALS
Filed Nov. 12, 1964
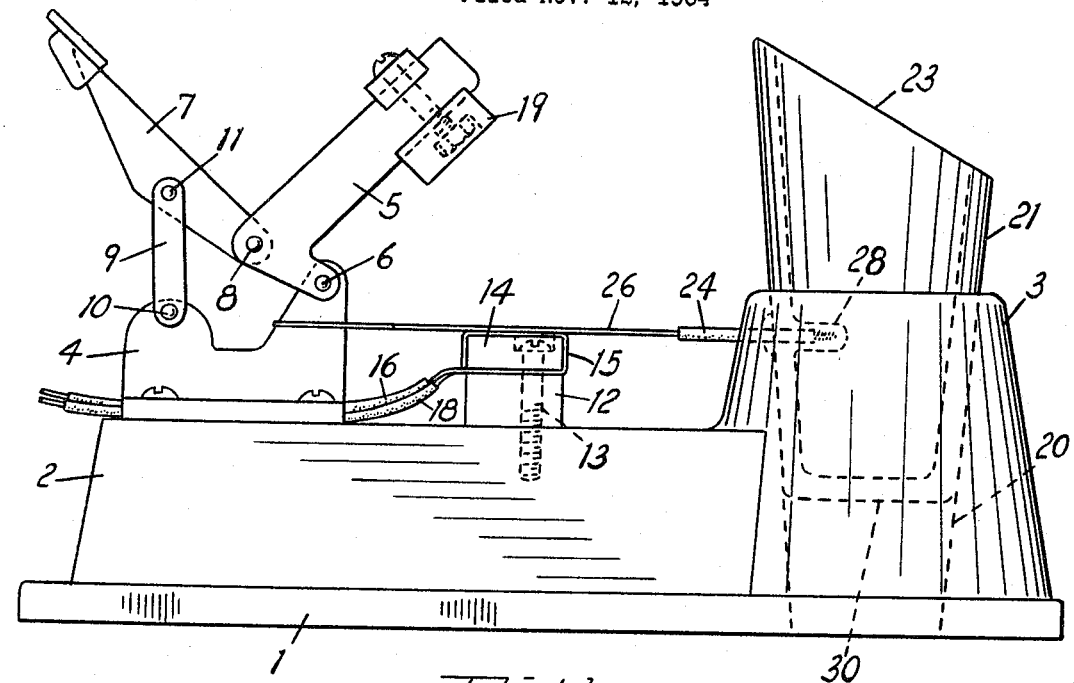
Fig. 1
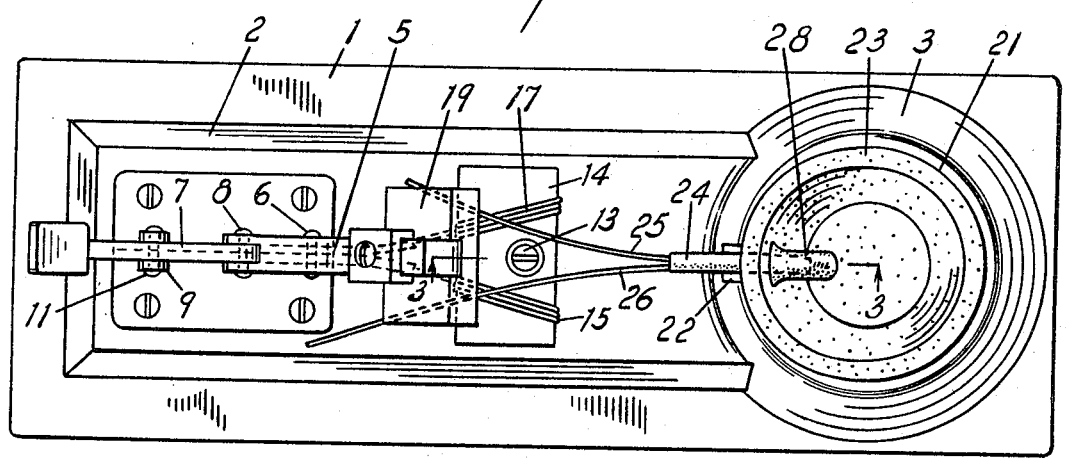
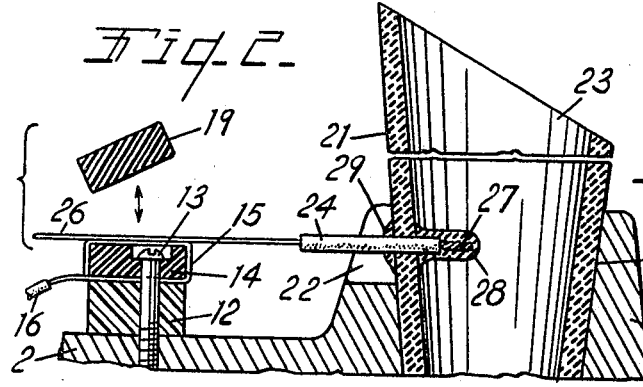
Fig. 2
Fig. 3
INVENTOR.
Daniel M. Anderson
BY Otto A. Earl
ATTORNEY.

United States Patent Office 3,321,973
Patented May 30, 1967

3,321,973
TEST APPARATUS AND MOLD FOR MOLTEN METALS
Daniel M. Anderson, South Haven, Mich., assignor to Refractory Products Company, Evanston, Ill.
Filed Nov. 12, 1964, Ser. No. 410,541
10 Claims. (Cl. 73—359)

This invention relates to improvements in Test Apparatus and Mold for Molten Metals. The principal objects of this invention are:

First, to provide a convenient and easily connectable apparatus for receiving molten metal and sensing the temperature of the metal as its cools and hardens.

Second, to provide a novel and inexpensive test mold for casting molten metal and sensing the temperature of the metal as it hardens which mold can be discarded after use.

Third, to provide a convenient fixture for removably receiving ceramic molds with thermocouples therein to support the mold while receiving molten metal and connect the lead wires of the thermocouple to recording instruments for measuring the temperature of the molten metal as it cools.

Fourth, to provide a ceramic mold of highly heat resistant material and having a thermocouple mounted in the wall thereof so that the mold and thermocouple can be mounted in a fixture and filled with molten metal without damage to the mold or the thermocouple.

Other objects and advantages of the invention will be apparent from a consideration of the following description and claims. The drawings, of which there is one sheet, illustrate a highly practical form of the test apparatus including the mold supporting fixture and contact making clamp thereof and the structure of the novel mold and thermocouple assembly.

FIG. 1 is a side elevational view of the mold supporting fixture and contact making clamp with a mold and thermocouple mounted therein ready to be connected to lead wires from recording instruments connected to the mold supoprt and clamp.

FIG. 2 is a top plan view of the structure shown in FIG. 1.

FIG. 3 is a fragmentary vertical cross sectional view taken along the plane of the line 3—3 in FIG. 2.

It is well known in the metallurgical art that many of the chemical and physical properties of metals can be determined and tested by measuring the temperatures and rates at which the molten metals solidify while cooling. Accordingly there have been various structures provided for receiving sample castings of molten metal and measuring the temperatures of the metal as it cools and solidifies by means of thermocouples projected into the molds. The present apparatus and invention provides an improved mold and mold holder for accomplishing this purpose with a minimum of effort and expense.

As shown in FIGS. 1 and 2 the mold receiving fixture consists of a base 1 having a raised rectangular pedestal 2 on one end and a circular hollow mold supporting cup 3 at the other end. Secured to the top of the pedestal 2 is a bracket 4 having a clamp lever 5 pivoted thereon at 6 and connected to a hand lever 7 by the pivot 8. The hand lever 7 is swingably supported on the bracket by a link 9 pivoted to the bracket at 10 and to the hand lever at 11. The arrangement of the links, pivots and levers is such that the swinging end of the clamp lever 5 can be moved downwardly and locked in tight gripping relation to a support or anvil 12 secured to the base by the screw 13. The top of the anvil carries an insulating block 14 having several turns of bared wire 15 on the end of one link wire 16 wrapped therearound at an angle. Several other bared turns 17 of another lead wire 18 are wrapped around the block in diverging relation and the lead wires are extended through the bracket 4 to recording instruments not illustrated. The swinging end of the clamp lever 5 carries an insulating block 19 which is adapted to firmly grip the wires of a thermocouple to the bared windings 15 and 17 as will be described. The clamp and anvil thus permit easy and rapid connection of the thermocouple to the recording instrument.

The cupped holder 3 defines a tapering recess 20 sized to receive the truncated conical mold 21 of refractory material and the upper rim of the mold receiving cup is notched as at 22 in FIGS. 2 and 3 to permit the lead wires from the thermocouple to extend through the side of the supporting cup. The refractory mold 21 is made of a suitable insulating and refractory material such as that disclosed in Patent 3,092,247 and desirably as a beveled or inclined top edge 23 to facilitate pouring the sample of molten metal into the mold.

Projecting through the side of the mold 21 in spaced relation between the bottom and top thereof and on the back or high side of the mold is a sleeve 24 of ceramic or other refractory material which gives structural support to the lead wires 25 and 26 of the thermocouple which are twisted together within the mold as at 27 in FIG. 3. The lead wires 25 and 26 are of dissimilar metals as in common in thermocouples and are flared in diverging relation as they leave the sleeve 24 to overlie the bared windings 15 and 17. The twisted inner ends 27 of the thermocouple and the inner end of the sleeve 24 are desirably covered with a coating 28 of refractory material which may be made of a slurry or paste of the same refractory material which makes up the mold 21. The coating 28 protects the thermocouple from the inrush of molten metal and also seals the opening through the side of the mold through which the thermocouple and sleeve 24 project. If desired an additional seal of the refractory paste may be applied around the sleeve at the outer side of the mold as at 29.

It will thus be seen that the refractory mold and thermocouple assembly is inexpensive and can be discarded with the solidified metal sample after the metal has cooled. At the same time the mold effectively retains the molten sample around the thermocouple so that the cooling cycle of the molten sample can be accurately recorded. The divergent character of the wires 25 and 26 of the thermocouple brings them automatically into overlapping relation to the bared windings 15 and 17 so that connection of the thermocouple to the recording instrument is easily and quickly effected by the manual clamp lever 7. The mold 21 desirably has a flat bottom 30 limiting the volume of the mold to the desired quantity for the sample to be tested.

The mold is desirably made by depositing a wet slurry of fibrous refractory material such as that mentioned in Patents 3,092,247 and 3,100,734 and including an aqueous mixture of colloidal silica, over a properly shaped porous form and drawing water through the form and bound together by the silica which solidifies when dry and which forms a refractory mineral binder.

What is claimed as new is:
1. A test mold and stand for molten metal comprising,
a base having a raised rectangular pedestal with a hollow mold holder at one end of the pedestal and projecting above the pedestal,
the upper edge of the holder having a notch formed therein over said pedestal,
a bracket mounted on the opposite end of said pedestal from said holder,
a clamp lever swingably mounted on said bracket and having an insulating clamp block on its swinging end, an anvil of insulating material secured to said pedestal in the path of said clamp block and having the bared ends of test instrument lead wires wrapped therearound in spaced relation, a manual lever and connecting link on said bracket connected to clamp said clamp block against said anvil, a truncated conical mold of refractory material sized to fit and being supported in said holder, a sleeve of refractory material projecting through the wall of said mold intermediate of the top and bottom thereof and extending into said notch, dissimilar wires of a thermocouple extending through said sleeve and engaged in electrical contact within said mold, a coating of refractory material the same as said mold covering the inner end of said sleeve and the engaged ends of said thermocouple wires, and another coating of refractory material sealing the outer end of said sleeve to the outside of said mold, the outer ends of said thermocouple wires extending in spaced relation over said bared ends of said lead wires to be clamped thereagainst by said clamp block, the top of said mold being inclined downwardly from above said sleeve and thermocouple.

2. A test mold and stand for molten metal comprising, a base having a raised pedestal with a hollow mold holder at one end of the pedestal and projecting above the pedestal, the upper edge of the holder having a notch formed therein over said pedestal, a bracket mounted on the opposite end of said pedestal from said holder, a clamp lever swingably mounted on said bracket and having an insulating clamp block on its swinging end, an anvil of insulating material secured to said pedestal in the path of said clamp block and having the bared ends of test instrument lead wires wrapped therearound in spaced relation, a manual lever and connecting link on said bracket connected to clamp said clamp block against said anvil, a truncated conical mold of refractory material sized to fit and being supported in said holder, a sleeve of refractory material projecting through the wall of said mold intermediate of the top and bottom thereof and extending into said notch, dissimilar wires of a thermocouple extending through said sleeve and engaged in electrical contact within said mold, a coating of refractory material covering the inner end of said sleeve and the engaged ends of said thermocouple wires, and another coating of refractory material sealing the outer end of said sleeve to the outside of said mold, the outer ends of said thermocouple wires extending in spaced relation over said bared ends of said lead wires to be clamped thereagainst by said clamp block, 3. A test mold and stand for molten metal comprising, a base having a hollow mold holder at one end and projecting above the base, the upper edge of the holder having a notch formed therein over said base, a bracket mounted on the opposite end of said base from said holder, a clamp lever swingably mounted on said bracket and having an insulating clamp block on its swinging end, an anvil of insulating material secured to said base in the path of said clamp block and having the contacts of test instrument lead wires thereon in spaced relation, a manual lever and connecting link on said bracket connected to clamp said clamp block against said anvil, a tapered mold of refractory material sized to fit and being supported in said holder, a sleeve of refractory material projecting through the wall of said mold intermediate of the top and bottom thereof and extending into said notch, dissimilar wires of a thermocouple extending through said sleeve and engaged in electrical contact within said mold, a coating of refractory material covering the inner end of said sleeve, the outer ends of said thermocouple wires extending in spaced relation over said contacts of said lead wires to be clamped thereagainst by said clamp block.

4. A test mold and stand for molten metal comprising, a base having a hollow mold holder at one end and projecting above the base, the upper edge of the holder having a notch formed therein, a bracket mounted on the opposite end of said base from said holder, a clamp lever swingably mounted on said bracket and having an insulating clamp block on its swinging end, an anvil of insulating material secured to said base in the path of said clamp block and having electrical contacts of test instrument lead wires thereon in spaced relation, a manual lever and connecting link on said bracket connected to clamp said clamp block against said anvil, a tapered mold of refractory material sized to fit and being supported in said holder with its upper part projecting above the holder, a sleeve of refractory material projecting through the wall of said mold intermediate of the top and bottom thereof and extending into said notch, dissimilar wires of a thermocouple extending through said sleeve and engaged in electrical contact within said mold, a coating of refractory material covering the inner end of said sleeve and sealing the sleeve to the wall of the mold, the outer ends of said thermocouple wires extending in spaced relation over said contacts of said lead wires to be clamped thereagainst by said clamp block.

5. A test mold and stand for molten metal comprising, a base having a mold holder at one end, the upper edge of the holder having a notch formed therein, a bracket mounted on the opposite end of said base from said holder, a clamp lever swingably mounted on said bracket and having an insulating clamp block on its swinging end, an anvil of insulating material secured to said base in the path of said clamp block and having electrical contacts of test instrument lead wires thereon in spaced relation, a manual lever on said bracket connected to clamp said clamp block against said anvil, a tapered mold of refractory material sized to fit and being supported in said holder with its upper part projecting above the holder, a sleeve of refractory material projecting through the wall of said mold intermediate of the top and bottom thereof, dissimilar wires of a thermocouple extending through said sleeve and engaged in electrical contact within said mold, the outer ends of said thermocouple wires extending in spaced relation over said contacts of said lead wires to be clamped thereagainst by said clamp block.

6. A test mold and stand for molten metal comprising,
a base having a mold holder at one end,
a bracket mounted on the opposite end of said base from said holder,
a clamp lever swingably mounted on said bracket and having an insulating clamp block on its swinging end,
an anvil of insulating material secured to said base in the path of said clamp block and having electrical contacts of test instrument lead wires thereon in spaced relation,
a manual lever on said bracket connected to clamp said clamp block against said anvil,
a tapered mold of refractory material sized to fit and being supported in said holder and projecting thereabove,
dissimilar wires of a thermocouple projecting through the wall of said mold intermediate of the top and bottom thereof,
and a coating of refractory material covering the inner connected ends of said thermocouple wires and sealing them to the side of said mold,
the outer ends of said thermocouple wires extending in spaced relation over said contacts of said lead wires to be clamped thereagainst by said clamp block.

7. A test mold and stand for molten metal comprising,
a base having a mold holder at one end,
a bracket mounted on the opposite end of said base from said holder,
a clamp lever swingably mounted on said bracket and having an insulating clamp block on its swinging end,
an anvil of insulating material secured to said base in the path of said clamp block and having electrical contacts thereon in spaced relation,
a manual lever on said bracket connected to clamp said clamp block against said anvil,
a tapered mold of refractory material sized to fit and being supported in said holder and projecting thereabove,
dissimilar wires of a thermocouple projecting through the wall of said mold intermediate of the top and bottom thereof,
the outer ends of said thermocouple wires extending in spaced relation over said contacts to be clamped thereagainst by said clamp block.

8. A test mold and stand for molten metal comprising,
a base having a mold locating surface at one end,
a bracket mounted on the opposite end of said base from said surface,
a clamp lever swingably mounted on said bracket and having an insulating clamp block on its swinging end,
an anvil of insulating material secured to said base in the path of said clamp block and having electrical contacts thereon in spaced relation,
a lever on said bracket connected to clamp said clamp block against said anvil,
a mold of refractory material sized to fit and being supported against said surface and projecting thereabove,
dissimilar wires of a thermo-couple projecting through the wall of said mold intermediate of the top and bottom thereof,
the outer ends of said thermocouple wires extending in spaced relation over said contacts to be clamped thereagainst by said clamp block.

9. A test mold and stand for molten metal comprising:
a base having a mold locating surface thereon;
a bracket mounted on said base and spaced from said surface;
anvil means of electrical insulating material secured to said base near said surface thereof and having spaced, electrical contacts on a surface thereof;
clamp means mounted on said bracket and having an electrical insulating clamp block adapted for movement into and out of a position adjacent said surface of said anvil means;
a mold of refractory material adapted for support by said surface of said base;
dissimilar wires of a thermocouple projecting through the wall of said mold intermediate the top and bottom thereof, the outer ends of said thermocouple wires being adapted to extend in spaced relation over said contacts to be clamped thereagainst by said clamp block.

10. A testing mold and stand according to claim 9, wherein the mold is tapered and the thermocouple wires are connected near the center of said mold.

References Cited

UNITED STATES PATENTS

| | | | |
|---|---|---|---|
| 1,660,504 | 2/1928 | Grubb | 73—359 |
| 1,773,826 | 8/1930 | Simms | 136—242 |
| 2,135,720 | 11/1938 | Krieg | 136—242 |
| 3,267,732 | 8/1966 | Hance | 73—359 |

FOREIGN PATENTS

| | | |
|---|---|---|
| 1,008,231 | 10/1964 | Great Britain. |

OTHER REFERENCES

Iron Age, July 27, 1944, page 40.

LOUIS R. PRINCE, *Primary Examiner.*

N. B. SIEGEL, *Assistant Examiner.*